United States Patent [19]
Schreiner

[11] Patent Number: 5,471,826
[45] Date of Patent: Dec. 5, 1995

[54] MOISTENER COLUMN FOR A COTTON HARVESTER

[75] Inventor: Joel M. Schreiner, Ankeny, Iowa

[73] Assignee: Deer & Company, Moline, Ill.

[21] Appl. No.: 190,804

[22] Filed: Feb. 1, 1994

[51] Int. Cl.⁶ .................................................. A01D 46/18
[52] U.S. Cl. .................................................. 56/41; 56/50
[58] Field of Search ............................. 56/41, 33, 34, 56/43, 44, 47, 50

[56] References Cited

U.S. PATENT DOCUMENTS

| | | | |
|---|---|---|---|
| 3,354,625 | 11/1967 | Taylor et al. | 56/44 |
| 3,381,457 | 5/1968 | Hubbard | 56/44 |
| 4,821,497 | 4/1989 | Deutsch et al. | 56/41 |
| 4,850,184 | 7/1989 | Deutsch et al. | 56/41 |
| 5,247,786 | 9/1993 | Schreiner | 56/41 |
| 5,355,663 | 10/1994 | Deutsch | 56/12.1 |

Primary Examiner—Terry Lee Melius

[57] ABSTRACT

A pivoting moistener column for a cotton harvester having a locking feature which operates without tools which automatically releases the column for swinging toward an access position when a service door is opened and which retains the column securely in the operating position when the service door is closed. Preferably the locking feature includes a pair of mating upright flanges, one connected to the service door near a service door pivot and the other connected to the moistener column opposite a moistener column pivot. The column is located near an outer wall of the harvester row unit housing and is substantially outside of the housing when in the service position. A fluid distribution system mounted on the column is supported outside of the housing in both the operating and service positions. Panel structure on the column forms a relatively smooth, continuous barrier with the service door for good cotton/cotton plant flow past the column.

17 Claims, 2 Drawing Sheets

5,471,826

MOISTENER COLUMN FOR A COTTON HARVESTER

BACKGROUND OF THE INVENTION

The present invention relates generally to cotton harvesters and, more specifically, to a moistener column structure for a cotton picker.

In a conventional cotton harvester, two upright picker drums support rows of spindles that project into the cotton plants. After the spindles remove cotton from the plants and the cotton is doffed, the spindles pass under pads of an upright moistener column which clean plant juices and other debris from the surface of the spindles. The moistener column includes an upright frame carrying a plurality of pad support arms which project laterally toward the spindles. Each pad support arm carries a flexible moistener pad having fins which project downwardly to wipe the passing spindles. A fluid supply system includes a distributor supported on top of the column with tubes extending downwardly through the column to each of the moistener pads. The column is supported from an upper panel of the row unit housing by a bracket and pivot assembly which provides vertical adjustment of the column for proper wiping relationship between the pads and the spindles.

The moistener column requires regular servicing, such as replacement of worn or damage pads. Areas adjacent the pads must also be reached for routine servicing or cleaning, and the moistener column presents an obstacle limiting access. Rotating moistener columns, such as shown in U.S. Pat. No. 4,850,184, can be pivoted away from the picking drum for easier servicing of components within the row unit housing. However, such structures require the use of a wrench to release the column for pivoting and to secure the column in the operating position. The location of the column is such that the pads are still well within the confines of the row unit housing even when pivoted to the service position. The fluid distributor is located in a greasy area that is difficult to access. At times, grease gets into the distributor during servicing and fouls the fluid lines.

Service doors must provide a smooth surface cotton plants in the row adjacent the row being picked by the row unit can pass without damage or snagging. In tandem drum units such as shown in U.S. Pat. Nos. 4,821,497 and 5,247,786, the service door area adjacent the rear drum acts as the inner wall of the cotton conveying chamber and therefore must provide a continuous surface for good cotton conveying characteristics.

BRIEF SUMMARY OF THE INVENTION

It is therefore an object of the present invention to provide an improved cotton harvester moistener column structure which overcomes most or all of the above mentioned problems. It is a further object to provide such an improved column structure which is relatively simple and inexpensive in construction and is easy to move between service and operating positions.

It is a further object of the present invention to provide an improved moistener column structure which can be moved between service and operating positions without use of a wrench or other tool. It is a further object to provide such a column structure which has an improved latching arrangement.

It is still another object of the present invention to provide an improved moistener column structure which relies on camming action between adjacent service door structure to releasably secure the column in the operating position. It is a further object to provide such a structure which does not require additional locks or latches on the moistener column. It is yet another object to provide such structure wherein the column is automatically released for movement to the service position when the service door is opened.

It is another object to provide an improved moistener column structure for a cotton harvester row unit which is easily movable between service and operating positions, wherein in the service position the moistener pads and the column fluid distribution system are positioned generally outside of the row unit housing for better serviceability. It is a further object to provide such structure which reduces grease contamination of the fluid distribution system.

It is still another object to provide an improved moistener column structure which is easily movable between an operating position and an access position and presents a generally smooth surface to cotton plants or harvested cotton in the operating position.

Moistener column structure constructed in accordance with the teachings of the present invention includes a moistener column connected to the row unit housing for pivoting about an upright axis between an inwardly directed operating position and an outwardly directed service position. An upright flange located on the column radially outwardly of the pivot projects into the path of a mating flange secured to the adjacent service door near the door pivot. When the column is pivoted to the operating position and the service door is closed, the door flange engages the column flange to secure the column in the operating position. The column remains secured in the operating position as long as the service door is locked in the closed position. By releasing the service door lock and slightly opening the door, the ,door flange pivots away from the column flange to allow the column to be swung out for easy access to the column components and to adjacent drum structure. Preferably, the moistener column is located near the outside of the row unit opposite the row receiving area so that the moistener column distributor system located on top of the column and the moistener pads are outside of the housing for increased accessibility to these components. The distributor system is also located outside the housing when the column is operational for increased visibility and reduced grease contamination. The structure eliminates need for tools to release and move the column to the service position. By simply closing and securing the service door in position, the column is held in the proper operating position without additional locks or latches. Panel structure on the moistener column provides a generally continuous surface which, near the front drum, helps deflect the cotton plants in the adjacent row and, near the rear drum, acts as a wall of the cotton conveying chamber.

These and other objects, features and advantages of the present invention will become apparent to one skilled in the art upon reading the following detailed description in view of the drawings.

DETAILED DESCRIPTION OF THE DRAWINGS

Figure 1:
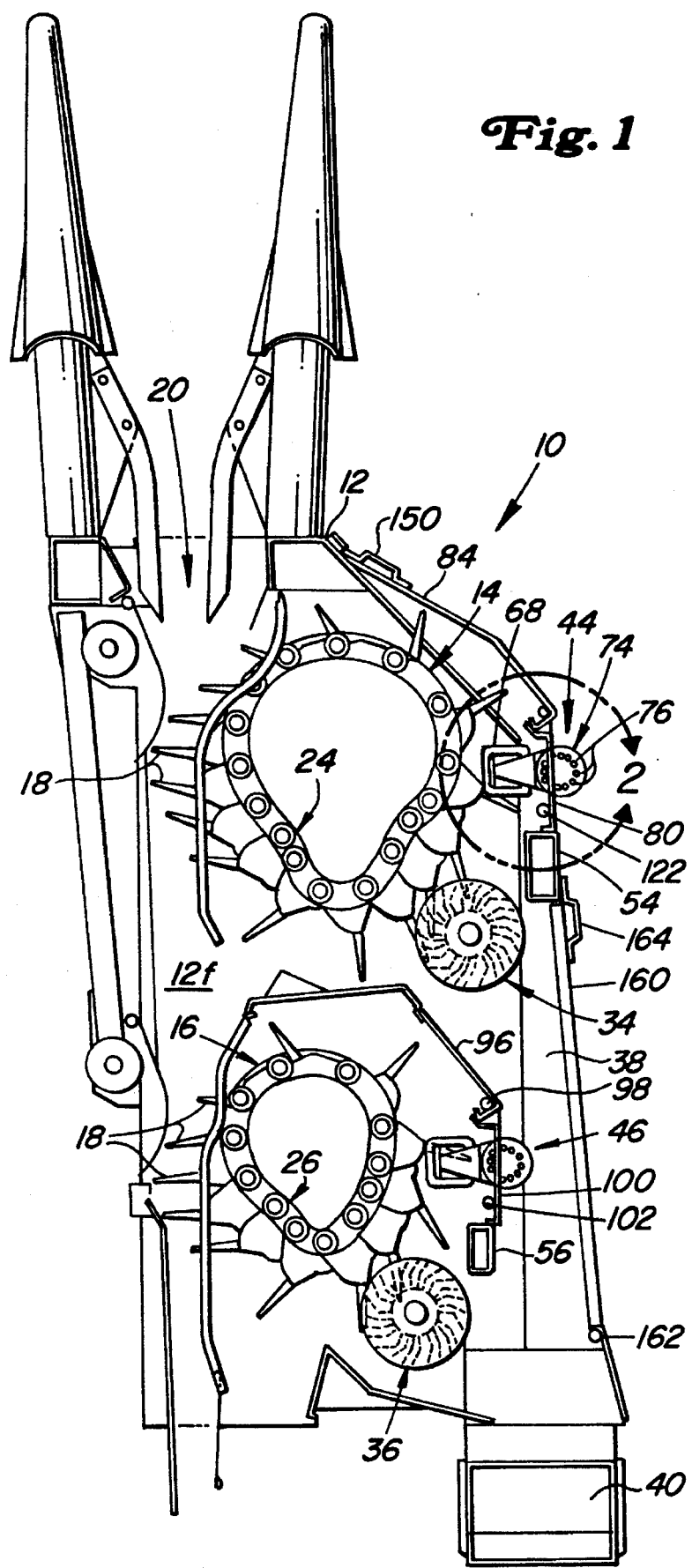
FIG. 1 is a top view of a cotton harvester row unit having a moistener column constructed in accordance with the teachings of the present invention.

Referring now to FIG. 1, therein is shown a cotton picker row unit 10 having a housing 12 which supports a pair of upright picker drums 14 and 16 above housing floor 12f. The drums 14 and 16 support rows of rotating spindles 18 which project into a row-receiving area 20 offset to one side of the drums to remove cotton from the plants. As the drums rotate about upright axes, cam structures 24 and 26 orient the rotating spindles 18. Doffer columns 34 and 36 doff the removed cotton from the spindles 18 and direct it into side door structure 38 where it is propelled rearwardly by air into a duct 40 for delivery to a cotton basket (not shown).

Once the cotton is doffed from the spindles 18, the cam structures 24 and 26 orient the spindles to pass through front and rear moistener column structures 44 and 46 which clean the spindles prior to reentry into the row-receiving area 20. The moistener column structures 44 and 46 are movably supported from the row unit housing 12 by pivot structure, which is described in further detail below, adjacent upright beam structures 54 and 56 which form part of the row unit housing frame on the side of the drums opposite the row-receiving area 20. The structure 46 is generally identical to that of the structure 44, and therefore only the structure 44 will be described in full detail below.

Figure 2:
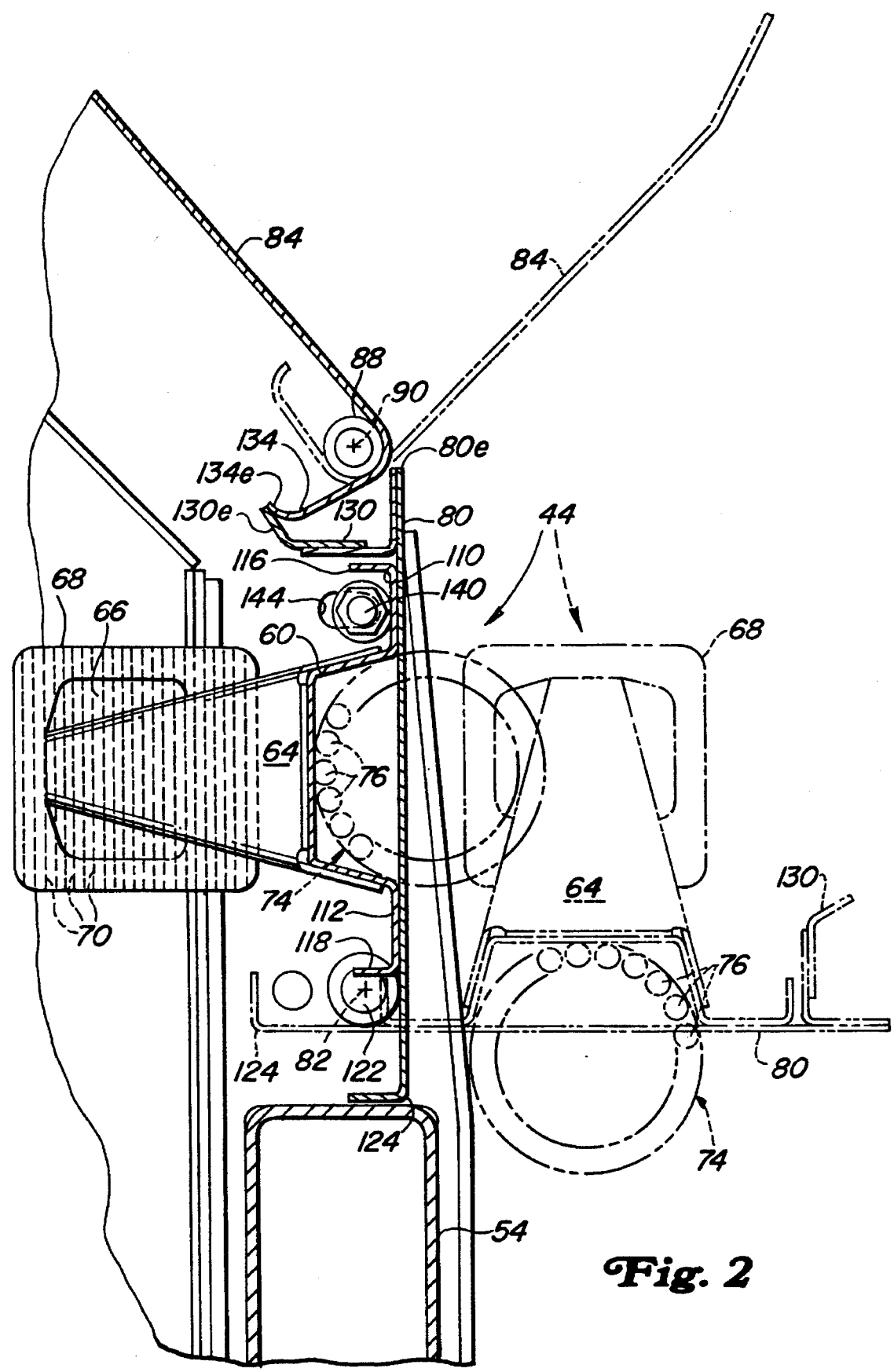
FIG. 2 is an enlarged top view of the forward moistener column on the row unit of FIG. 1 and showing the moistener column in the operating position (solid lines) and in the service position (broken lines).

The moistener column structure 44 includes an upright column frame 60 which is channel-shaped and opens outwardly (FIG. 2). A plurality of vertically spaced pad holders 64 are secured to the frame 60 and extend laterally to pad holder ends 66 which, in the operating position shown by the solid lines of FIG. 2, are located above the paths of the rows of spindles 18. A conventional flexible moistener pad 68 is secured to each pad holder end 66 and includes downwardly projecting rows of fins 70 which contact the spindles 18.

The column frame 60 extends vertically from the floor 12f of the housing 12 to a location above the top of the drum 14 and above the intermediate panel located below the upper drive structure in the housing drive (not shown). The upper end of the frame 60 supports a conventional fluid distribution system 74 which directs fluid into fluid tubes 76 which are routed through the frame 60 to the individual pad holders 64. The fluid passes through the base of the pads 68 and onto the fins 70 to help clean the spindles.

Panel structure 80 is secured to the outer side of the column frame 60 for pivoting with the frame about an upright axis 82 located near the aft edge of the panel structure 80. The panel structure 80 acts as a small access door in the area outwardly of the frame 60. A main forward access door 84 is pivotally connected near its aft end to the housing 12 by upright pivot structure 88 for rocking about an upright axis 90 between a closed operating position (solid lines of FIGS. 1 and 2) and an open service position (broken lines of FIG. 2). The axis 90 is located adjacent the forward edge 80e of the panel structure when the column structure is in the operating position. As can be appreciated from the drawings, the access door 84 and the panel structure 80, when in the operating positions, define a generally continuous plant deflecting surface to provide smooth flow of the cotton plants in the row adjacent the unit 10. A corresponding access door 96 and panel structure 100 adjacent the column structure 46 are pivotally connected for rocking with respect to the housing about upright axes 98 and 102, respectively, to define a generally continuous cotton deflecting surface within the side door structure 38 when in the operating position shown in FIG. 1.

As seen in FIG. 2, the column frame 60 includes upright, planar sections 110 and 112 connected to the panel structure 80. Front and rear flanges 11,5 and 118 project inwardly, and the rear flange 118 is connected to a pivot 122. The pivot 122 is connected to the housing 12 and supports the column for rocking about the axis 82 between the operating (solid lines) and the service (broken lines) positions. Preferably, the pivot 122 includes a threaded bolt and nut support which depends from the housing 12 adjacent the intermediate panel for adjusting the column structure 44 for proper positioning of the pads 68 with respect to paths of the spindles. The aft side of the panel structure 80 includes an angle portion 124 which is adjacent the beam structure 54 when the column is in the operating position. The panel structure 80 terminates in an upright forward edge 80e closely adjacent the door pivot structure 88.

An upright flange 130 is fixed near the forward edge 80e of the panel 80 for rocking with the column structure 44. The flange 130, which preferably extends substantially the length of the column structure 44, projects inwardly at a right angle to the panel structure 80 and in a forwardly projecting innermost edge 130e. The door 84 includes a mating upright flange 134 which extends substantially the length of the door at an angle of slightly less than 90 degrees to the plane of the remainder of the door. The flange 134 has an end portion 134e which engages the innermost edge 130e of the flange 130 when the door 84 is closed with the column structure 44 in the operating position. When the door 84 is opened (broken lines of FIG. 2), the flange 134 pivots out of interfering relationship with the flange 130. Upper and lower adjustable stops 140 contact the upper and lower ends of the section 110 of the frame 60 to prevent counterclockwise rotation (as viewed in FIGS. 1 and 2) of the column past the operating position. Each stop 140 includes a cylindrical member secured by a bolt passing through a slot 144. The lower slot 144 (shown) is located in the floor 12f, and the upper slot is in a flange located adjacent the intermediate sheet. The end portion 134e bears against the flange edge 130e to secure the column structure 44 in the operating position when the door 84 is closed. A latch 150 maintains the door 84 in the closed position.

To access the unit 10 for inspection and servicing, the operator releases the latch 150 and pivots the door 84 in the clockwise direction about the axis 90. The flange 134 pivots away from the flange 130 to release the column structure 44 for rocking about the axis 82 to the service position (broken lines of FIG. 2). In the service position, the pads 68 are located outwardly of the row unit housing for easy access. The fluid distribution system 74 is also conveniently located for servicing. In the operating position of the column structure 44, the distribution system 74 is also located outside the housing for increased visibility and reduced grease contamination.

A main rear access door 160 is pivotally connected at 162 to the housing 12 and opens outwardly for access to the rear column structure 46. The access door 96 is opened to release the column structure 46 for swinging outwardly about the axis 102 in a manner similar to that described above for the column structure 44. The doors 96 and 160 and the panel structure 100 define relatively smooth side boundaries for the cotton conveying path through the door structure 38. The location of the doors and the column structure assure easy access to most service areas when the doors are opened and the column is pivoted outwardly about the axis 102.

Having described the preferred embodiment, it will become apparent that various modifications can be made without departing from the scope of the invention as defined in the accompanying claims.

I claim:

1. In a cotton harvester having a row unit with cotton harvesting structure including an upright spindle drum supported within a row unit housing, the housing having an outer wall and defining a row receiving area, the spindle drum including a plurality of spindles movable in a path which passes through the row receiving area, and an upright moistener column with moistener pads for cleaning the spindles, column support and locking structure comprising:

a column support supporting the moistener column from the housing for movement between an operating position wherein the moistener pads are located within the housing adjacent the path of the spindles and an access position wherein the column is supported from the housing with the pads offset outwardly from the spindle path and outwardly of the housing;

column securing structure having an unlatching position and a latching position, wherein the securing structure in the latching position maintains the column in the operating position and in the unlatching position facilitates movement of the column to the access position; and further including a service door supported by the housing and movable between an open position for providing access to the harvesting structure and a closed harvesting position, wherein the column securing structure comprises a contact member connected to the service door.

2. The invention as set forth in claim 1 further including panel structure located on the column for movement therewith between the operating and service positions, wherein in the operating position the panel structure forms a generally continuous barrier with the service door.

3. The invention as set forth in claim 1 wherein the moistener column includes a first flange, and wherein the contact member bears against the first flange when the service door is in the closed position.

4. The invention as set forth in claim 3 wherein the contact member comprises a second upright flange which matingly engages the first Upright flange substantially along the entire length of the first upright flange.

5. In a cotton harvester having a row unit with cotton harvesting structure including an upright spindle drum supported within a row unit housing, the housing having an outer wall and defining a row receiving area, the spindle drum including a plurality of spindles movable in a path which passes through the row receiving area and an upright moistener column with moistener pads for cleaning the spindles, column support and locking structure comprising:

a column support supporting the moistener column from the housing for movement between an operating position wherein the moistener pads are located within the housing adjacent the path of the spindles and an access position wherein the column is supported from the housing with the pads offset outwardly from the spindle path and outwardly of the housing;

column securing structure having an unlatching position and a latching position, wherein the securing structure in the latching position maintains the column in the operating position and in the unlatching position facilitates movement of the column to the access position; and wherein the moistener column is pivotally connected to the housing for rotation about a first upright axis, and the securing structure includes an upright member pivotally connected to the housing adjacent the first upright axis for rotation about a second upright axis.

6. The invention as set forth in claim 5 wherein the first upright axis is located adjacent the outer wall of the row unit housing, wherein in the operating position the column is substantially contained within the housing and in the access position the column is offset outwardly from the housing for facilitating access to the column.

7. The invention as set forth in claim 6 including a fluid distribution system secured to the upper end of the column and located outwardly of the housing when the column is in the access position.

8. The invention as set forth in claim 7 wherein in the operating position of the column, the fluid distribution system is also located outwardly of the housing.

9. In a cotton harvester having a row unit with cotton harvesting structure including an upright spindle drum supported within a row unit housing, the housing having an outer wall and defining a row receiving area, the spindle drum including a plurality of spindles movable in a path which passes through the row receiving area, and an upright moistener column with moistener pads for cleaning the spindles, column support and locking structure comprising:

a column support supporting the moistener column from the housing for movement between an operating position wherein the moistener pads are located within the housing adjacent the path of the spindles and an access position wherein the column is supported from the housing with the pads offset outwardly from the spindle path and outwardly of the housing;

column securing structure having an unlatching position and a latching position, wherein the securing structure in the latching position maintains the column in the operating position and in the unlatching position facilitates movement of the column to the access position; and wherein the column is located on the side of the spindle drum opposite the row receiving area.

10. In a cotton harvester having a row unit with cotton harvesting structure including an upright spindle drum supported within a row unit housing, the housing having an outer wall and defining a row receiving area, the spindle drum including a plurality of spindles movable in a path which passes through the row receiving area, a service door supported by the housing and movable between an open position for providing access to the harvesting structure and a closed harvesting position, and an upright moistener column with moistener pads for cleaning the spindles, column support and locking structure comprising:

a column support supporting the moistener column for movement between an operating position wherein the moistener pads are located within the housing adjacent the path of the spindles and an access position wherein the pads are offset outwardly from the spindle path; and column securing structure connected for movement with the service door between an unlatching position corresponding to the open position of the door, and a latching position corresponding to the closed position of the door, wherein the securing structure in the latched position maintains the column in the operating position and in the unlatched position facilitates movement of the columns to the access position.

11. The invention as set forth in claim 10 wherein the column securing structure comprises a service door extension, the extension located adjacent the column in interfering relationship with the column when the door is in the closed position and offset from the column path when the door is in the open position.

12. The invention as set forth in claim 11 wherein the moistener column includes a first upright flange, and wherein the service door extension-bears against the first flange when the service door is in the closed position.

13. The invention as set forth in claim 12 wherein the service door extension comprises a second upright flange which matingly engages the first upright flange substantially along the entire length of the flange.

14. The invention as set forth in claim 10 wherein the moistener column is pivotally connected to the housing for rotation about a first upright axis, and the door is pivotally connected to the housing adjacent the first upright axis for rotation about a second upright axis.

15. The invention as set forth in claim 14 wherein the first upright axis is located adjacent the outer wall of the row unit housing, wherein in the operating position the column is substantially contained within the housing and in the access position the column is offset outwardly from the housing for facilitating access to the column.

16. The invention as set forth in claim 15 including a fluid distribution system secured to the upper end of the column and located outwardly of the housing when the column is in the access position.

17. The invention as set forth in claim 10 wherein the moistener column structure includes an outer panel, the outer panel moveable to a closed position as the column structure moves to the operating position, wherein the outer panel in the closed position forms a generally continuous barrier with the service door outwardly of the drum.

* * * * *